Dec. 3, 1968 A. A. SOUZA 3,414,172
DISPENSING DEVICE
Filed March 21, 1966
2 Sheets-Sheet 1
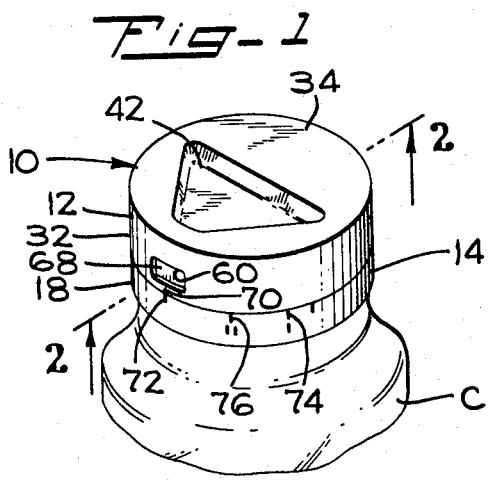
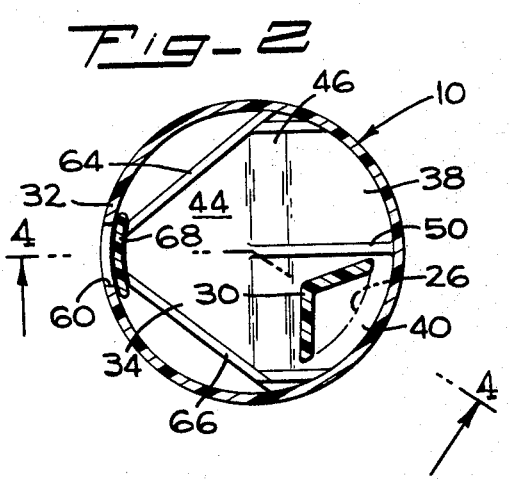
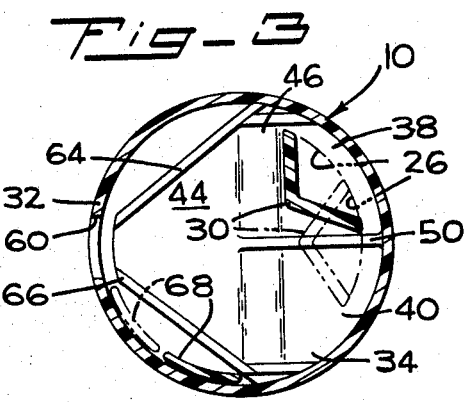
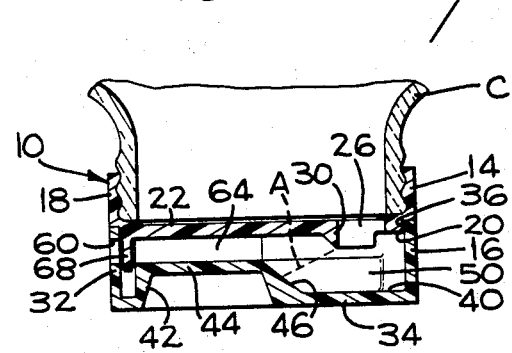
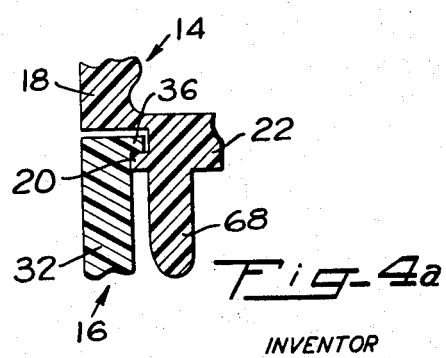
INVENTOR
AUGUSTINE A. SOUZA
BY Paul B. Fike
PATENT AGENT

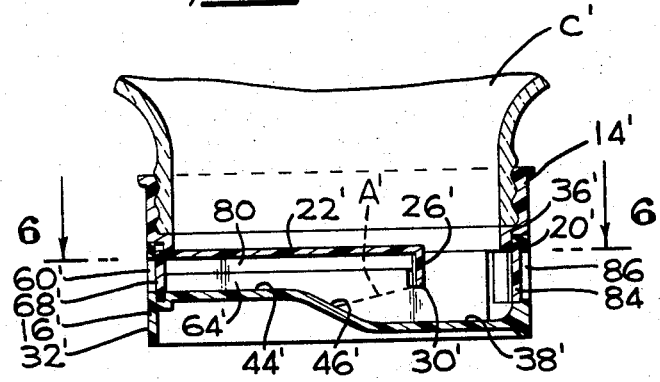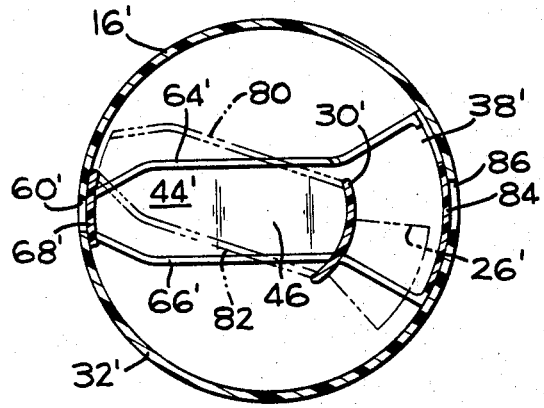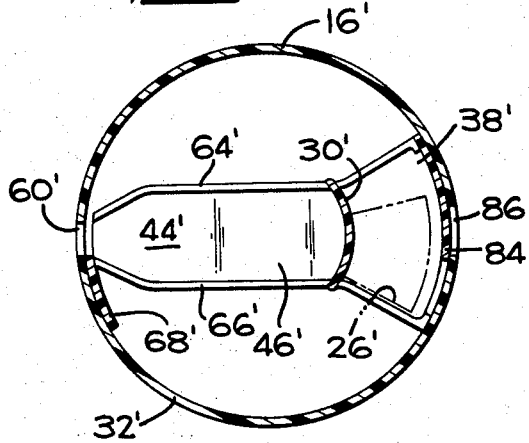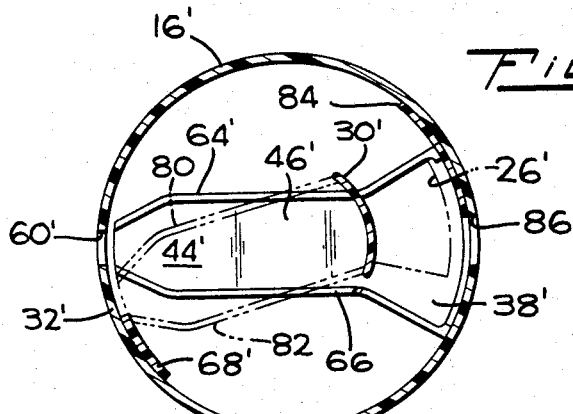

United States Patent Office 3,414,172
Patented Dec. 3, 1968

3,414,172
DISPENSING DEVICE
Augustine A. Souza, San Jose, Calif., assignor of one-half interest to Anthony A. Souza
Filed Mar. 21, 1966, Ser. No. 535,759
6 Claims. (Cl. 222—443)

ABSTRACT OF THE DISCLOSURE

A dispensing device for fluent granular materials or the like in the form of a bottle cap including two relatively-rotatable sections with communicating conduits arranged to dispense a predetermined amount of the material upon appropriate manipulation.

---

The present invention relates generally to dispensing devices, and more particularly to improvements in dispensing devices of the type disclosed in my prior United States Patent No. 3,221,951 adapted to dispense a measured quantity of fluent granular material or the like.

Generally, it is an object of the present invention to provide an improved dispensing device which facilitates control of dispensing of granular materials such as sugar, powered coffee and the like.

It is a feature of the invention to provide a dispensing device including a particularly simple yet effective valve mechanism for control of the dispensing operation.

Additionally, it is a feature of the invention to provide a dispensing device operable to enable alternatively a continuous dispensing of material or the restricted dispensing of a predetermined measured quantity thereof.

Yet more specifically, it is a feature of the invention to provide for the alternative dispensing of selected quantities of the material, for example, one or two teaspoons of sugar.

Quite specifically, it is a feature of the invention to provide a dispensing device in the form of a cap which can be applied as a closure to the top of a bottle or other container for granular material.

An additional feature of the invention is the provision of a dispensing device in the form of two releasably interconnected sections capable of relative adjustment to enable the controlled dispensing of the granular material.

It is a particularly significant feature of the invention to provide a dispensing device having two such sections, each of which is an integral structure having no moving parts wherefore it is capable of formation, for example, in a simple plastic molding operation.

These as well as other objects and features of the invention will become more apparent from a perusal of the following description of the exemplary structures illustrated in the accompanying drawings wherein:

FIG. 1 is a perspective view of a dispensing device constituting one embodiment of the invention and more particularly, in the form of a cap applied to the top of a container, FIG. 2 is a slightly enlarged transverse sectional view taken along line 2—2 of FIG. 1 illustrating interior details of the structure, FIG. 3 is a view similar to FIG. 2 but illustrating the cap in alternative operative dispositions, FIG. 4 is a vertical sectional view taken along line 4—4 of FIG. 2, the cap and a fragmentary portion of the container to which it is attached being illustrated in an inverted position, FIG. 4a is an enlarged fragmentary sectional view of a portion of the cap as otherwise illustrated in FIG. 4, FIG. 5 is a sectional view similar to FIG. 4, but illustrating a modified embodiment of the invention, FIG. 6 is a horizontal sectional view taken along line 6—6 of FIG. 5 and illustrating the cap in one operative position, FIG. 7 is a view similar to FIG. 6 but illustrating the cap in a second operative position, and FIG. 8 is a view similar to FIGS. 6 and 7, but illustrating the cap in yet a third position of operation.

With initial reference to FIGS. 1–4, the dispensing device constituting one embodiment of the present invention is similar in its broadest aspects to that disclosed in my prior United States Patent No. 3,221,951. In this broad sense, the device includes a body member 10 having a first conduit arranged to conduct material therethrough when in one position and a communicating second conduit which extends transversely relative to the first conduit so as to conduct fluent granular material therethrough only when said body member has been rotated to a different disposition.

More particularly, and in accordance with the present invention, the body member 10 is formed entirely of two separate releasably interconnected sections, a first connector section 14, and a second dispenser section 16, each of which preferably constitutes a unitary molded plastic element. Generally, when conjoined, the two sections 14, 16 form the aforementioned conduits and the unit can be applied after the fashion of a cap to the threaded neck of a container C which is adapted to contain a fluent granular material such as sugar, powdered coffee, or the like.

The connector section 14 generally takes the form of a shallow cup having a cylindrical side wall 18, the interior of which is threaded to enable its application by screwed connection to the threaded neck of the container. A circular end wall 22 is integrally formed with the cylindrical side wall 18 of the connector section and has formed therein an aperture 26, preferably in the form of a segment of a circle, which accordingly forms the first conduit that allows granular material to pass from the container C therethrough when the container is in an inverted position as illustrated in FIG. 4. With continued reference to FIG. 4 and additional specific reference to FIGS. 2 and 3, a dependent V-shaped flange 30 projects downwardly from the interior edge of the aperture 26 for a purpose to become more apparent hereinafter. On the opposite side of the end wall 22, an arcuate flange projects downwardly therefrom at its peripheral edge to function as a valve member 68, as will become more apparent hereinafter.

In order to provide releasable interconnection of the connector section 14 with the mentioned dispenser section 16, the peripheral edge of the end wall 22 is withdrawn slightly from the cylindrical exterior surface of the side wall of the connector section 14 and two diametrically opposed flanges 20 project outwardly from the end wall at its lowermost extremity as shown in FIG. 4, each of these flanges having an arcuate extent of something less than 90° (e.g. 85°).

The dispenser section 16 is also generally in the form of a shallow cup having a cylindrical side wall 32 whose exterior dimensions are equivalent to that of the connector section 14 and whose open end is arranged to receive therewithin the recessed end wall 22 of the connector section 14 so that, as clearly shown in FIGS. 1 and 4, smooth continuity of the exterior cylindrical side walls 18, 32 of the two sections is achieved. Interiorly, the cylindrical side wall 32 of the dispenser section 16 also includes two diametrically opposed inwardly projecting flanges 36 having an arcuate extent of something less than 90° and dimensionally arranged to interlock with the outwardly projecting flanges 20 at the extremity of the connector section 14 so as to hold the two sections in their illustrated assembled relationship. The engagement between the two sections 14, 16 provides sufficient friction so that no relative rotation will occur unless external manual force is applied. However, when the two sections 14, 16 are to be separated, appropriate relative manual rotation thereof will remove the flanges 20, 36 from interengagement and permit relative axial motion thereof to effect the separation. Quite obviously, assembly of the two sections 14, 16 involves merely a reversed procedure.

When so assembled, the dispenser section 16, in conjunction with the end wall 22 of the connector section 14 forms the mentioned second conduit which communicates with the first conduit formed by the aperture 26 through the end wall 22 in the connector section 14 and extends transversely therefrom to an aperture in the cylindrical side wall 32 of the dispenser section which accordingly forms the dispensing exit opening 60.

More particularly, the end wall 34 of the dispenser section is formed with a generally triangular indentation 42 which in turn forms a raised triangular platform 44 within the dispenser section 16 as viewed in FIG. 4, the apex of such triangular platform lying adjacent to the described exit opening 60. At the opposite, or base end of the triangular platform 44 a sloping ramp 46 is formed extending downwardly into two pockets or receptacles 38, 40 which are adapted to underlie the aperture 26 in the end wall 22 of the connector section 16 so as to receive fluent granular material delivered therethrough, each pocket having a measuring capacity of one teaspoonful of the granular material. The two pockets or receptacles 38, 40 are separated by a partition 50 which rises from the end wall 34 of the dispenser section, as shown in FIG. 4, to a level approximately equal to that of the mentioned triangular platform 44, and in turn, granular material is retained within the pockets 38, 40 and directed toward the exit opening 60 by guide walls 64, 66 which extend from opposite sides of the two pockets 38, 40 and thereafter in an inwardly convergent fashion along the sides of the triangular platform 44 to a point adjacent the described exit opening 60. These guide walls 64, 66 are sufficiently high so as to lie closely adjacent the end wall 22 of the connector section 14 when the two sections are assembled.

It is to be particularly observed that a slight space is maintained between the apex end of the triangular platform 44 and the exit opening 60 and this space is dimensioned so as to receive the downwardly projecting arcuate valve member 68 on the connector section 14. It will therefore be obvious that if the two sections are relatively rotated to an appropriate disposition, the arcuate valve member 68 will close the exit opening 60 in the fashion illustrated in FIG. 2, thus to preclude any dispensing from the unit. Such closure position is indicated to the user by the alignment of the indexing mark 70 below the exit opening 60 in the dispenser section 16 with a first mark 72 on the connector section 14.

If it is desired to dispense one teaspoonful of granular material from the container C, the dispenser section 16 is rotated relative to the connector section 14 until the indexing mark 70 on the dispenser section lies above a second mark 74 on the connector section. At this position, the aperture 26 is aligned with one of the pockets or receptacles 38 as shown in full lines in FIG. 3. After such adjustment is made, the entire container C will be inverted from its initial upright position as shown in FIG. 1 to the inverted disposition shown in FIG. 4 whereupon granular material can flow through the aperture 26 into the receptacle 38 thereunder, the flow of granular material stopping when the receptacle is filled to the extent indicated in FIG. 4 by the dotted line A extending from the lower extremity of the V shaped flange 30 to an intermediate position on the ramp 46 thereunder, such line representing the angle of repose of the granular material. It will thus be seen that in this inverted position no granular material will be dispensed laterally through the exit opening 60. The entire container C with the attached dispensing device is then rotated through an additional angle of 90° into a position whereat the exit opening 60 is directed downwardly and the granular material can flow from the receptacle 38 over the ramp 46 and platform 44 through the exit opening 60. In turn, the material adjacent the V-shaped flange 30 will be re-directed into the container C and only the precisely measured amount (e.g. one teaspoonful) of granular material will be dispensed.

If, alternatively, it is desired to dispense two teaspoonfuls of granular material from the dispensing device, the dispenser section 16 is rotated relatively to the connector section 14 until the indexing mark 70 on the dispenser section lies adjacent a third mark 76 on the connector section for such measured dispensing. In this position, the aperture 26 overlies both the receptacles 38, 40 as indicated in phantom lines in FIG. 3. Upon inversion of the container C from its upright to an inverted disposition as shown in FIG. 4, both receptacles 38, 40 will be filled and subsequently additional arcuate rotation of the container through a 90° angle will effect dispensing of two teaspoonfuls of granular material from the dispensing device through its exit opening 60.

In summary, appropriate positioning of the dispenser section 16 relative to the connector section 14 allows one to select a closure position, a first operative position whereat one teaspoonful of granular material can be dispensed or, alternatively a second operative position whereat two teaspoonfuls of granular material can be dispensed.

If a measured quantity of granular material is to be dispensed, or as an alternative, a continuous flow of material is, upon occasion desired, a slightly modified embodiment of the invention as shown in FIGS. 5-8 can be employed. Since this modified arrangement is similar in many respects to the first embodiment of the invention, corresponding parts will be indicated by corresponding numerals with an added prime notation.

Generally, the connector section 14' and the dispenser section 16' are of matching cylindrical exterior contour and are arranged for releasable interconnection through the use of interconnecting flanges 20', 36' substantially identical with those described in connection with the first embodiment of the invention. A corresponding aperture 26' is formed in the end wall 22' of the connector section 14' and has attached at its innermost curved edge a dependent arcuate flange 30'. From the extremities of this flange 30', relatively shallow guide walls 80, 82 extend to the opposite side of the end wall 22', converging slightly at their extremities. A valve member 68' in the form of an arcuate dependent flange projects downwardly from the edge of the end wall 22' of the connector section as viewed in FIG. 5 in a fashion similar to that of the previously described first embodiment of the invention and a second longer arcuate flange also projects downwardly therefrom at a diametrically opposite position to function as a second valve member 84 in a manner to be described in detail hereinafter.

The dispenser section 16' is formed to provide a single receptacle 38' disposed between upstanding guide walls 64', 66' which are continued adjacent an intermediate ramp 46' and a platform 44' to an exit opening 60' in the dispenser section side wall 32', again much in the fashion of the arrangement of the first embodiment of the invention. However, an additional opening 86 is provided adjacent the receptacle 38' or at a position diametrically opposite to the described exit opening 60' and the guide walls 64', 66' terminate at opposite ends short of the cylindrical side wall 32' of the dispenser section 16' so as to form arcuate slots in which the described arcuate flanges or valve members 68', 84 can be received for motion when the two sections 14', 16' are relatively rotated. In addition, the guide walls 64', 66' on opposite sides of the pocket or receptacle 38' are broken to permit slideable passage therethrough of the dependent arcuate flange 30' adjacent the inner edge of the aperture 26' in the connector section 14' again, when the two sections 14', 16' are relatively rotated.

When the dispensing device is in its closed position, as illustrated in FIG. 6, both of the valve members 68', 84 are in positions of closure over the two diametrically opposed exit openings 60', 86 as shown clearly in FIG. 6. A slight amount of rotation of the dispenser section 16' relative to the connector section 14' will bring the sections into the position illustrated in FIG. 7 which allows the dispensing of one teaspoonful of granular material in the fashion generally described in connection with the first embodiment of the invention. More particularly, the one valve member 68' is removed from its position of closure over the exit opening 60' adjacent the end of the platform 44' while, on the other hand, the other longer arcuate valve member 84 remains over the other exit opening 86 to maintain the latter in a closed disposition. In this position guide walls 80, 82, 64', 66' on the connector and dispenser sections 14', 16' are aligned and the curved flange 30' adjacent the aperture 26' is in a central position so as to span the entire space between the guide walls and thus limit the flow of material into the pocket 38' wherein a line of repose as shown at A' in FIG. 5 is attained upon inversion of the container C' and dispensing device thereon.

Yet further rotation of the dispenser section 16' relative to the connector section 14' to the position illustrated in FIG. 8 allows the continuous dispensing of the material from the container C' and dispensing device thereon. In this position both the valve members 68', 84 are removed from positions of closure over the exit openings 60', 86 and a partial inversion of the unit, so that the exit opening 86 adjacent the pocket 38' is directed generally downwardly, will allow material to flow from the container C' through the aperture 26' in the connector section end wall 22' and thence directly through the exit opening 86 to a point of use, the flow being continuous so long as such position is maintained, and of course, stopping when the container C' is returned to a generally upright position.

The various illustrated positions in this second embodiment of the invention can also be indicated to the user by suitable markings (not shown) on the sides of the dispenser and connector sections 14', 16' in the same fashion as shown in FIG. 1 in connection with the first embodiment of the invention.

It will be quite apparent that various additional modifications and alterations can be made in the structures as described without departing from the spirit of the invention, and the foregoing description of two embodiments of the invention is to be considered therefore as purely exemplary and not in a limiting sense. The actual scope of the invention is to be indicated only by reference to the appended claims.

What is claimed is:

1. A dispensing device for granular material which comprises:
   a body member having a first conduit arranged to receive and conduct material therethrough when in a first position,
   a second conduit in said body member communicating with said first conduit and extending transversely relative thereto so as to conduct material therethrough when said body member is rotated to a second position, and
   means within said body member operable to close at least one of said conduits to preclude flow of material therethrough,
   said second conduit including exit openings at opposite ends thereof,
   said conduit closing means including two valve members cooperatively arranged to effect closure of one or both of said exit openings.

2. A dispensing device for granular material which comprises:
   a body member having a first conduit arranged to receive and conduct material therethrough when in a first position,
   a second conduit in said body member communicating with said first conduit and extending transversely relative thereto so as to conduct material therethrough when said body member is rotated to a second position,
   the entrance end of said second conduit being arranged to form at least two receptacles adapted for receipt of measured quantities of material from said first conduit when said body member is in its first position, and
   means operable to selectively direct flow of material from said first conduit into one or more of said receptacles.

3. A dispensing device according to claim 2 wherein: said body member includes two releasably interconnected sections.

4. A dispensing device according to claim 3 wherein: said sections are relatively displaceable one with regard to another, and
   said first conduit is formed in one section for relative displacement into alternative positions over one or more of said receptacles.

5. A dispensing device according to claim 4 which comprises:
   a valve member mounted on one of said sections for movement between conduit closing and opening positions upon appropriate movement of said sections relative to one another.

6. A dispensing device according to claim 5 wherein: each of said sections constitutes a unitary element having no moving parts.

References Cited

UNITED STATES PATENTS

| | | | |
|---|---|---|---|
| 1,640,583 | 8/1927 | Steinruck | 222—457 |
| 2,006,019 | 6/1935 | Holes. | |
| 3,094,253 | 6/1963 | Hvistendahl | 222—425 X |
| 3,201,009 | 8/1965 | Smith | 222—443 |

ROBERT B. REEVES, *Primary Examiner.*

F. R. HANDREN, *Assistant Examiner.*